United States Patent
Hass et al.

(10) Patent No.: US 6,754,729 B1
(45) Date of Patent: Jun. 22, 2004

(54) INTERNALLY CONNECTED NETWORK INTERFACE CARDS FOR CLUSTERED PROCESSING

(75) Inventors: Kenneth A. Hass, Georgetown, TX (US); Robert L. Nance, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 699 days.

(21) Appl. No.: 09/631,538

(22) Filed: Aug. 3, 2000

(51) Int. Cl.⁷ .................................................. G06F 3/00
(52) U.S. Cl. ........................ 710/14; 710/2; 710/100; 710/300; 709/220; 709/250; 709/251; 340/825
(58) Field of Search .................... 710/2, 17, 100, 710/300; 340/825; 709/220, 251, 250

(56) References Cited

U.S. PATENT DOCUMENTS

| | | | |
|---|---|---|---|
| 5,313,595 A | 5/1994 | Lewis et al. ................. 395/325 |
| 5,467,453 A | * 11/1995 | Kocis ......................... 710/300 |
| 5,467,543 A | 11/1995 | Fink et al. ................... 395/281 |
| 5,596,723 A | 1/1997 | Romohr ................. 395/200.16 |
| 5,758,081 A | * 5/1998 | Aytac ......................... 709/212 |
| 5,802,391 A | * 9/1998 | Hwang ........................... 710/2 |
| 5,838,723 A | * 11/1998 | Mack et al. ................. 375/220 |
| 6,052,733 A | 4/2000 | Mahalingam et al. ........ 709/235 |
| 6,092,131 A | * 7/2000 | Caldwell et al. ............. 710/100 |
| 6,108,740 A | * 8/2000 | Caldwell ..................... 710/305 |

OTHER PUBLICATIONS

U.S. Pending patent application Ser. No. 09/150,800 entitled "Automatic Location Determination of Devices in a Networked Environment" by Subhashini Rajan, et al.; Dell USA, L.P. (DC–01459), filed Sep. 10, 1998.

\* cited by examiner

*Primary Examiner*—Jeffrey Gaffin
*Assistant Examiner*—Justin Knapp
(74) *Attorney, Agent, or Firm*—Baker Botts L.L.P.

(57) ABSTRACT

A single-chassis clustered network system (10) having internal connectors (14) that eliminate the need for wiring out the back of the chassis. Each main board (11) has a network interface card (12), an internal connector (14), an external connector (13), and an autosense circuit (15). The autosense circuit (15) detects when the internal connectors (14) are being used, and disables the external connectors (13), or vice versa.

19 Claims, 2 Drawing Sheets

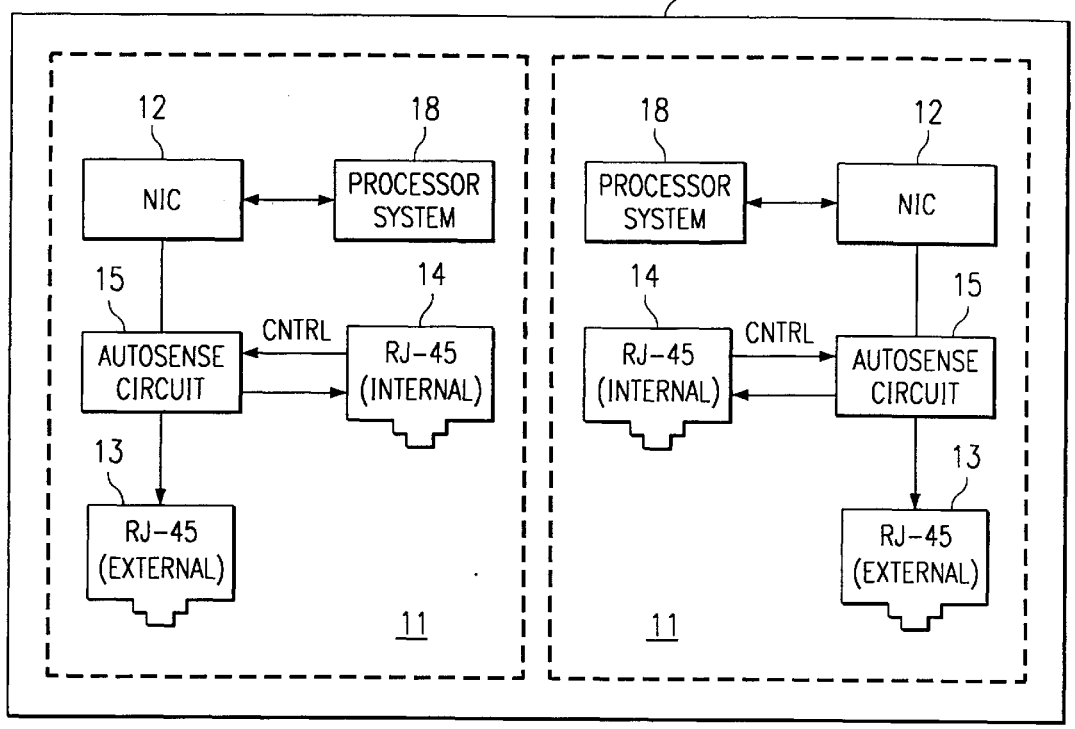

INTERNALLY CONNECTED NETWORK INTERFACE CARDS FOR CLUSTERED PROCESSING

TECHNICAL FIELD

This invention relates to computer networks, and more particularly to an architecture that permits network interface cards to be internally connected within the same computer chassis.

BACKGROUND

"Clustering" is a technique associated with computer architectures. A clustered architecture has two or more computers in a group, which provide higher availability and scalability than possible if the computers worked separately. The group is managed as a single system and the computers in the group share a common namespace. The group is specifically designed to tolerate failures and to support the addition or removal of components in a manner that is transparent to users.

One application of clustering is for network server computers. When servers are clustered, each server (a node) runs cluster software that provides services such as failure detection, recovery, and the ability to manage the servers as a single system. The nodes within a cluster must be connected in a way such that each node is aware of the state of other nodes. This is typically accomplished with a private interconnect that uses dedicated network interface cards to guarantee good communication among the nodes. For example, each server might have a cable connection out the back of its chassis to one or more other servers in the cluster.

SUMMARY

One aspect of the invention is a single-chassis, multi-computer, network processing system. The system has at least two main boards, each main board being a computer and having processing circuitry, and each being located in the same computer chassis. Each main board further has: a network interface card for sending and receiving network signals, an internal network connector, an external network connector, and an autosense circuit. The internal connectors may be used to connect two main boards with wiring internal to the chassis. The autosense circuit is operable to detect when internal connector are being used in this manner, and when the internal connectors are so being used, to route network signals from the network interface card to the internal network connector. The autosense circuit also disables the external connectors when the internal connectors are being used.

An advantage of the invention is that it provides a "cluster in a box" for clustering network nodes. Two servers, or other computers, each having its own main board, can be placed in the same chassis. The boards can have an internal point-to-point connection, avoiding the need for external wiring. At the same time, each server continues to be alternatively capable of a standard external network connection.

BRIEF DESCRIPTION OF THE DRAWINGS

FIG. 1 is a plan view of a shelf, such as might be placed in a computer chassis, having two network interface cards that are internally connected in accordance with the invention.

FIG. 2 illustrates various types of jack connectors, which may be used for the internal or external connectors of FIG. 1.

DETAILED DESCRIPTION

Figure 3:
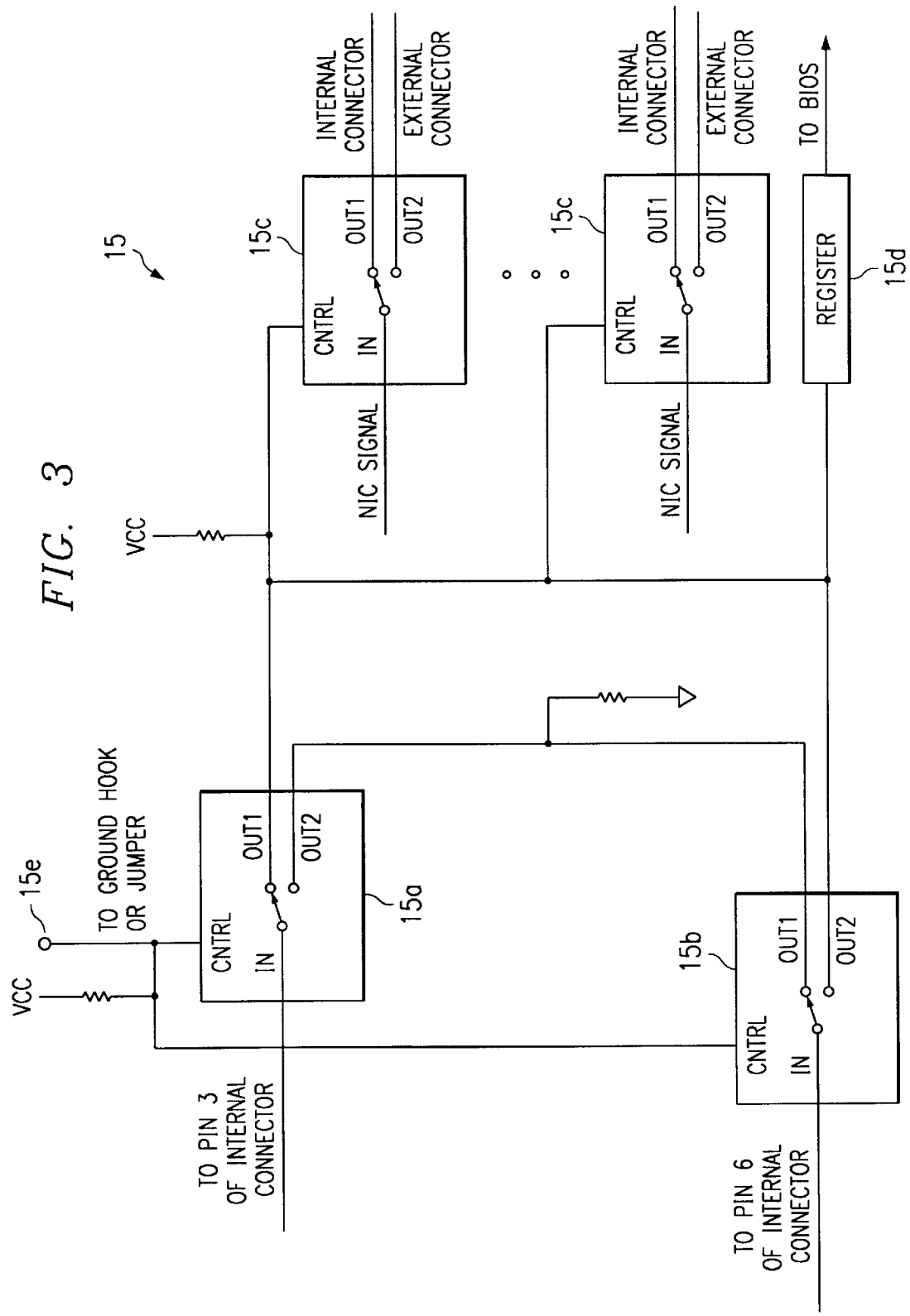
FIG. 3 is one example of the autosense circuit of FIG. 1.

FIG. 1 is a plan view of a shelf 10, such as might be placed in a rack of a computer chassis. Shelf 10 has two main boards 11, each representing a "computer" and each having a network interface card (NIC) 12.

In accordance with the invention, each NIC 12 has an internal connector 14 and an external connector 13, with an autosense circuit 15 for switching between the connectors. As explained below, the main boards 11 may be internally connected (clustered) to each other using internal connectors 14. Alternatively, they may use an external connector 13 to connect to each other (clustered) or to some other (unclustered) device. Thus, shelf 10 represents a multi-computer network system, whose computers are capable of being clustered or not clustered.

In the example of this description, shelf 10 is assumed to be used for a network server cluster. Each main board 11 is a server computer. Although the emphasis of FIG. 1 is on those components of main board 11 relevant to the invention, each main board 11 also has whatever processing resources are appropriate for a network server. For example, main board 11 would typically have a processing system 18 with at least one processor and associated memory. As an example of network server clustering, one server might provide email services and another might provide database services, each being capable of taking over the tasks of the other in case the other fails.

In other embodiments, shelf 10 might contain two clustered end node computers. In this embodiment, each main board 11 is also a "computer" and has at least one processor and associated memory. However, its hardware and software resources would be designed for end user applications, such as for a workstation.

It should be understood that the clustering of two computers (main boards) is for purposes of example. Any number of computers may be similarly clustered, although a larger shelf or more than one shelf may be required to contain the main boards.

NICs 12 may be embedded on the main board 11, or may be in the form of an expansion board. The term "NIC" as used herein is defined as any network connection gateway, whether in the form of an expansion board, such as a card added into a slot, or an embedded NIC. In other words, although the acronym NIC contains the word "card", the term as used herein may also mean NIC circuitry that is mounted directly on main board 11.

An example of a specific form factor for the shelf of FIG. 1 is one sometimes referred to as "2 in a U", where the U represents an industry standard for the rack height. The two main boards 11 are installed side by side in the rack, within the specified rack height. The embedding of each NIC 12 on an associated main board 11 permits conformance with this standard. In other embodiments, main boards 11 might be in the same chassis, but not necessarily on the same shelf.

As indicated above, each NIC 12 may be alternatively connected to either an internal connector 14 or an external connector 13. In this example of this description, both connectors 13 and 14 are Registered Jack 45 (RJ-45) connectors. The RJ-45 standard calls for an eight wire connector and is used commonly to connect nodes onto a network. However, the concepts described herein could be applied to other types of wired network connectors. It is not required that both connectors 13 and 14 be of the same type.

FIG. 2 illustrates an RJ-45 connector, as well as additional jack type connectors, which may be used for either connector 13 or connector 14. Examples of other types of possible connectors are DIN type or sub-D type connectors. As explained below, for purposes of clustering main boards 11 in accordance with the invention, internal connectors 14 are assumed to have at least two "extra" pins.

For each main board 11, its external connector 13 is used to connect the main board 11, via its NIC 12, to a network medium. These external connectors 13 could be used for either non-clustered or clustered applications. For clustering, the two external connectors 13 would be used to connect the main boards 11 out the back of shelf 10 in a conventional manner.

For each main board 11, its internal connector 14 provides an alternative means for clustering main boards 11 to each other. Using internal connectors 14, main boards 11 may be internally connected to each other. That is, they may be connected to each other without the need for wiring off the shelf 10.

For each NIC 12, its external connector 13 and internal connector 14 are used in "either . . . or" manner. In other words, only one of the connectors may be used. If one connector is being used, the other connector is inoperable. As explained below, an autosense circuit 15 is used to activate external connector 13 or internal connector 14. It disables the external connector 13 when the internal connector 14 is being used, and vice versa.

Each connector 13 has a given number of connector pins, with at least two "extra" pins. As stated above, for the RJ-45 standard, there are eight pins. In typical networks, for standard network connectivity, four of the RJ-45 pins are used, and four are not used. Thus, where connector 13 is an RJ-45 connector, it has four "extra" pins. As indicated in FIG. 2, pins 3–6 of an RJ-45 connector are "extra" pins.

Referring again to FIG. 1, each autosense circuit 15 is connected to the extra pins (CTL) of its internal connector 14. When a cable is used to internally connect a first internal connector 14 to a second internal connector 14, the two extra pins are electrically connected when they would otherwise not be. When this occurs, autosense circuit 15 switches the signal from NIC 12 to the internal connector 14 so that network data will be routed through the internal connector 14 rather than through the external connector 13. The external connector 13 is effectively disabled.

FIG. 3 illustrates one example of autosense circuit 15. When a connector 13 or 14 of a first board 11 is connected to a corresponding connector 13 or 14 of a second board 11, the autosense circuit 15 of each board 11 provides the proper switching, as well as a status signal. Each board 11 has an autosense circuit 15, but as explained below, switches 15a and 15b have a ground hook 15e on one board 11 (as shown in FIG. 3), but not on the other board 11.

In this example, the extra pins are pins 3 and 6 of an RJ-45 connector. For clustering two main boards 11, pin 3 of one internal connector 14 is connected to pin 3 of the other internal connector 14. This connection is the input to switch 15a. Likewise, pin 6 of one internal connector 14 is connected to pin 6 of the other internal connector 14, so as to provide the input for switch 15b.

Four switches 15c each direct one of the four data signals from NIC 12. Depending on the position of switches 15a and 15b, switches 15c provide a control signal (CNTRL) that determines whether data is routed to internal connector 14 or to external connector 13. When internal connector 14 is not connected to another internal connector 14, the CNTRL signal to switches 15c is high. When internal connector 14 is not connected, the CNTRL signal is low.

Register 15d provides a connector status bit, which indicates whether connector 13 or connector 14 is being used. For example, register 15d might be an I/O mapped register used to provide a status bit for a BIOS process. A status signal could be used to turn on a status indicator light (such as an LED) or an on-screen message during start up. The input to register 15d is high unless internal connector 14 is connected.

In effect, switches 15a and 15b provide a cross-up for pins 3 and 6. In the autosense circuit 15 of FIG. 3, either pin 6 goes to ground and pin 3 goes to switches 15c and register 15d, or vice versa. A ground hook 15e is provided for one board 11 (as shown), but not on the other. When internal connectors of the two boards 11 are connected, switches 15a and 15b are thrown in opposite directions. However, the switches 15c and register 15d will see the same (low) signal.

Switches 15a, 15b, and 15c may be implemented with simple transistor-based circuitry.

Other Embodiments

Although the present invention has been described in detail, it should be understood that various changes, substitutions, and alterations can be made hereto without departing from the spirit and scope of the invention as defined by the appended claims.

What is claimed is:

1. A single-chassis, multi-computer, network processing system, comprising:
    at least two main boards, each having at least a processor and associated processing circuitry, and each being located in the same computer chassis;
    wherein each main board further has:
        a network interface card for sending and receiving network signals;
        an internal connector, switchably connected to the network interface card and having at least two extra connections not used for network signals;
        an external connector, switchably connected to the network interface card;
        an autosense circuit operable to detect when the internal connector of that main board is connected to an internal connector of another of the main boards, and when the internal connector is so connected, to route network signals from the network interface card to the internal network connector such that the external connectors are disabled.

2. The system of claim 1, wherein the autosense circuit is operable to detect when one or more extra pins of the internal connector are in electrical connection with corresponding pins of another internal connector.

3. The system of claim 1, wherein the external connector is an RJ-45 connector.

4. The system of claim 1, wherein the internal connector is an RJ-45 connector.

5. The system of claim 1, wherein the network interface card is an add-on card to the main board.

6. The system of claim 1, wherein the network interface card is implemented with circuitry on the main board.

7. The system of claim 1, wherein the main boards are on the same shelf within the chassis.

8. The system of claim 1, wherein the main boards represent network servers.

9. The system of claim 1, wherein the autosense circuit has a register having at least one bit indicating whether the internal connector or the external connector is being used.

10. The system of claim 1, wherein the autosense circuit provides a connector status signal to software of the main board.

11. A method of providing clusterable network computers housed in the same chassis, comprising the steps of:
   connecting a network interface card to the main board of each computer;
   providing an internal connector and an external connector for each main board;
   connecting each network interface card to an autosense circuit that is operable to detect when two or more main boards are connected via their internal connectors, and when such a connection occurs, to switch network signals from the network interface card to the internal connectors such that the external connectors are disabled.

12. The method of claim 11, wherein the autosense circuit is operable to detect when one or more extra pins of the internal connector are in electrical connection with corresponding pins of another internal connector.

13. The method of claim 11, wherein the external connector is an RJ-45 connector.

14. The method of claim 11, wherein the internal connector is an RJ-45 connector.

15. The method of claim 11, wherein the network interface card is an add-on card to the main board.

16. The method of claim 11, wherein the network interface card is implemented with circuitry on the main board.

17. The method of claim 11, wherein the main boards are on the same shelf within the chassis.

18. The method of claim 11, wherein the main boards represent network servers.

19. The method of claim 11, further comprising the step of generating a connector status signal indicating whether the internal connector or the external connector is being used.

* * * * *